United States Patent
Oh et al.

(10) Patent No.: US 8,482,673 B2
(45) Date of Patent: Jul. 9, 2013

(54) METHOD AND APPARATUS FOR DISPLAYING VIDEO SIGNALS FROM A PLURALITY OF INPUT SOURCES

(75) Inventors: Sung-bo Oh, Suwon-si (KR); Tae-hee Lee, Yongin-si (KR); Young-taek Yoo, Hwaseong-si (KR); Hyoung-woo Jeon, Suwon-si (KR); Jae-ho Park, Incheon (KR); Na-rae Yun, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 308 days.

(21) Appl. No.: 12/822,303

(22) Filed: Jun. 24, 2010

(65) Prior Publication Data
US 2011/0181781 A1 Jul. 28, 2011

Related U.S. Application Data

(60) Provisional application No. 61/244,492, filed on Sep. 22, 2009.

(30) Foreign Application Priority Data

Jan. 22, 2010 (KR) .............................. 10-2010-6068

(51) Int. Cl.
*H04N 5/14* (2006.01)
(52) U.S. Cl.
USPC .......................................... 348/565; 348/571
(58) Field of Classification Search
None
See application file for complete search history.

(56) References Cited

U.S. PATENT DOCUMENTS

| | | | | |
|---|---|---|---|---|
| 5,818,439 A * | 10/1998 | Nagasaka et al. | ................ | 725/87 |
| 7,825,991 B2 * | 11/2010 | Enomoto | ....................... | 348/588 |
| 8,112,711 B2 * | 2/2012 | Ackley | ........................... | 715/716 |
| 2005/0086687 A1 * | 4/2005 | Omoigui | ......................... | 725/35 |
| 2005/0134739 A1 | 6/2005 | Bian | | |
| 2007/0046821 A1 * | 3/2007 | Mead et al. | .................... | 348/571 |
| 2009/0153737 A1 * | 6/2009 | Glen | ............................. | 348/571 |

FOREIGN PATENT DOCUMENTS
EP 2 117 231 A1 11/2009
JP 2009-188444 8/2009

OTHER PUBLICATIONS

European Search Report issued Dec. 21, 2010 by the European Patent Office in EP Patent Application No. 10177040.2.

* cited by examiner

*Primary Examiner* — Gims Philippe
*Assistant Examiner* — Reza Aghevli
(74) *Attorney, Agent, or Firm* — Stanzione & Kim, LLP (57) ABSTRACT

Provided are an apparatus and method thereof for displaying video signals on a display screen of a display apparatus, wherein the video signals are received by the display apparatus from a plurality of input sources. The method includes: determining whether a medium input from a first input source of the display apparatus is in a loading process; if the medium is in the loading process, displaying in a sub-window on the display screen a video signal output from the first input source of the display apparatus; if the medium is in the loading process, displaying in a main window on the display screen a video signal output from a second input source of the display apparatus. The video signal from the first input source may be downscaled and transmitted to the display device so as to conserve resources in both the first input source and the display device.

21 Claims, 10 Drawing Sheets

METHOD AND APPARATUS FOR DISPLAYING VIDEO SIGNALS FROM A PLURALITY OF INPUT SOURCES

CROSS-REFERENCE TO RELATED APPLICATIONS

This application claims priority under 35 U.S.C. §119(a) from Korean Patent Application No. 2010-0006068, filed on Jan. 22, 2010, in the Korean Intellectual Property Office, and U.S. Provisional Application No. 61/244,492 filed Sep. 22, 2009, in the U.S. Patent Office, the contents of which are incorporated herein by reference in its entirety.

BACKGROUND

1. Field of the Invention

Apparatuses and methods consistent with the present invention relate to a method and apparatus displaying video signals from a plurality of input sources.

2. Description of the Related Art

When a user attempts to play a medium such as a Digital Versatile Disc (DVD) or a Blu-ray Disc (BD) in a media playing device, the medium must first go through a loading process before the playback of the main video occurs. As a result, the user may be burdened in that she must wait until the loading process completes before she is able to watch the main video on her video display device.

Similarly, there may be other times where a user wants to display a video signal output from a media playing device, but wants to do so without monopolizing the display devices resources as the displaying of the video signal output from the media playing device may be of secondary importance to user with respect to simultaneously displaying a video signal from another source. In such cases, it would be desirable to minimize the video display device's usage of resources by not having to display a high definition video signal output from the media playing device while simultaneously displaying video signals from other input sources.

SUMMARY

Exemplary embodiments of the present invention overcome the above disadvantages and other disadvantages not described above. Also, the present invention is not required to overcome the disadvantages described above, and an exemplary embodiment of the present invention may not overcome any of the problems described above.

As aspect of the present invention provides a method for displaying video signals on a display screen of a display apparatus, wherein the video signals are received by the display apparatus from a plurality of input sources. The method may include: determining whether a medium input from a first input source of the display apparatus is in a loading process; if the medium is in the loading process, displaying in a sub-window on the display screen a video signal output from the first input source of the display apparatus; if the medium is in the loading process, displaying in a main window on the display screen a video signal output from a second input source of the display apparatus.

According to an exemplary embodiment of the present invention, the method may further include determining whether the loading process of the medium input from the first input source is complete; and if the loading process of the medium input from the first input source is complete, displaying in the main window the video signal output from the first input source of the display apparatus.

According to an exemplary embodiment of the present invention, if the loading process of the medium input from the first input source is complete, the method may further include canceling the displaying of the sub-window on the display screen.

According to an exemplary embodiment of the present invention, the method may further include: determining whether a user selects the sub-widow displayed on the display screen; and if the user selects the sub-window displayed on the display screen, the method may further include closing the sub-window, and displaying the video signal output from the first input source in the main window on the display screen.

According to an exemplary embodiment of the present invention, the determining of whether the medium input from the first input source of the display apparatus is in the loading process may include monitoring a High-Definition Multimedia Interface (HDMI) connection between the first input source and the display apparatus.

According to an exemplary embodiment of the present invention, the displaying in the sub-window on the display screen may include downscaling the video signal output from the first input source.

According to an exemplary embodiment of the present invention, the method may further include buffering the downscaled video signal, and the displaying in the sub-window on the display screen may include transmitting the buffered video signal to the display apparatus and displaying the buffered video signal received by the display apparatus in the sub-window on the display screen.

According to an exemplary embodiment of the present invention, the transmitting of the buffered video signal to the display apparatus may include transmitting the buffered video signal to the display apparatus over a High-Definition Multimedia Interface (HDMI) connection.

According to an exemplary embodiment of the present invention, wherein the HDMI connection may include an Ethernet channel.

According to an exemplary embodiment of the present invention, the method may further include: displaying at least one other sub-window on the display screen, wherein each of the at least one other sub-windows may display a video signal output from one of the second input source and another source, and the video signal output from the one of the second input source and the other source may be downscaled.

According to an exemplary embodiment of the present invention, the first input source may be one of a Blu-ray Disc (BD) player and a Digital Versatile Disc (DVD) player.

Another aspect of the present invention provides a method for displaying a video signal on a display screen of a display apparatus, wherein the display apparatus is connected to an alternate input source via a High-Definition Multimedia Interface (HDMI) connection and the HDMI connection includes an Ethernet channel, the method may include: downscaling the video signal from the alternate input source; transmitting the downscaled video signal to the display apparatus via the Ethernet channel of the HDMI connection; displaying in a main window on the display screen a video signal output from a main input source of the display apparatus; and displaying in a sub-window on the display screen the downscaled video signal received from the alternate input source.

Another aspect of the present invention provides a media playing apparatus for transmitting a downscaled video signal from an input source to a display apparatus during a loading process of a medium, the media playing apparatus may include: a media playing unit which is operable to receive the medium, perform the loading process of the medium and output a video signal corresponding to the playing of the medium; a downscaler which is operable to downscale the video signal output from the media player and to output a downscaled video signal; a memory which is operable to buffer the downscaled video signal received from the downscaler; a communication module which is operable to transmit the buffered video signal from the memory to the display apparatus; and a controller, wherein the controller determines whether the media playing unit is performing the loading process of the medium, and if the media playing unit is performing the loading process of the medium, the controller controls the downscaler to downscale the video signal output from the media playing unit and to output the downscaled video signal, controls memory to buffer the downscaled video signal received from the downscaler and controls the communication module to transmit the buffered video signal from the memory to the display apparatus.

According to an exemplary embodiment of the present invention, the controller may further determine whether the loading process of the medium is complete, and if the loading process of the medium is complete, the controller may control the communication module to stop transmitting the buffered video signal from the memory to the display apparatus.

According to an exemplary embodiment of the present invention, the controller may determine whether the media playing unit is performing the loading process of the medium by monitoring a High-Definition Multimedia Interface (HDMI) connection between the media playing apparatus and the display apparatus.

According to an exemplary embodiment of the present invention, the transmitting of the buffered video signal to the display apparatus may include transmitting the buffered video signal to the display apparatus over a High-Definition Multimedia Interface (HDMI) connection.

According to an exemplary embodiment of the present invention, the HDMI connection may include an Ethernet channel.

According to an exemplary embodiment of the present invention, the first input source may be one of a Blu-ray Disc (BD) player and a Digital Versatile Disc (DVD) player.

Another aspect of the present invention provides a video display apparatus which communicates with a first input source via a High-Definition Multimedia Interface (HDMI) connection, wherein the HDMI connection includes an Ethernet channel, the video display apparatus may include: a display screen; a communication module which is operable to receive a downscaled video signal from the first input source via the Ethernet channel of the HDMI connection; an input module which is operable to receive an input video signal from a second input source; and a controller, wherein if the controller receives the downscaled video signal from the communication module, the controller controls the display screen to display the downscaled video signal in a sub-window on the display screen and controls the display screen to display the input video signal received from the second input source in a main window on the display screen.

According to an exemplary embodiment of the present invention, the controller may further determine whether a first control signal is received from the first input source via the HDMI connection, wherein the first control signal may indicate the first input source is performing a loading process of a medium.

According to an exemplary embodiment of the present invention, if the controller determines the control signal is received from the first input source via the HDMI connection, the controller may send a second control signal to the first input source via the HDMI connection, wherein the second control signal may control the first input source to transmit the downscaled video signal from the first input source to the video display apparatus via the Ethernet channel of the HDMI connection.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF THE EMBODIMENTS

Hereinafter, exemplary embodiments of the present invention will be described with reference to accompanying drawings, wherein like numerals refer to like elements and repetitive descriptions will be avoided as necessary.

Recently, the high definition multimedia interface (HDMI) specification (e.g., version 1.4, a publicly available specification that is hereby incorporated by reference) has changed so as to incorporate an Ethernet channel, which allows for an Ethernet connection between HDMI connected devices.

Typically, a medium such as a DVD or a BD will include one main video (which of course could be divided into chapters or some other subdivision). However, the medium also typically includes many other shorter video segments besides the main video. There may be certain video segments on the medium which are output by the media player during a physical loading of the medium. For example, the loading process might include the outputting of a copyright warning message or a message saying "LOADING MEDIUM," etc. However, as used herein, the phrase "loading process" may include more than just the outputting of a video signal during the physical loading of a medium by a media player. For example, the loading process might also include the outputting an introductory segment prefacing the main video, a logo, a screen saver, previews or trailers for other available movie/videos, advertisements, etc. Thus the phrase "loading process" as used herein is intended to broadly include all of these sorts of possibilities.

Additionally, it should be noted that the term "Ethernet," as used herein, includes all of the different varieties of Ethernet defined in the various IEEE 802.3x Ethernet-related standards (e.g., 10 Mbit/s Ethernet, Fast Ethernet, Gigabit Ethernet, 10-gigabit Ethernet, 100-gigabit Ethernet, etc.). Further, the official Ethernet standards IEEE 802.3x are hereby incorporated by reference. Thus, while HDMI 1.4 may presently include provisioning for 100 Mb/s Ethernet connections, future versions of HDMI may include provisioning for other versions of Ethernet under the IEEE 802.3x standards, or for that matter wireless communication under the 802.11x standards.

For example, a display apparatus may include an 802.11x wireless port which communicates with wireless devices (e.g., wireless internet router), and also an HDMI port which connects to external HDMI-ready devices. Thus, while the exemplary embodiments described herein include Ethernet communications and HDMI 1.4, the general concept of the present invention is not necessarily limited thereto. One of skill in the art would understand that the present invention could equally be applied to different networking standards.

As used herein the term "medium" is primarily used in conjunction with DVD and BD media. However, the present invention is not limited to these specific standards. One of skill in the art would understand that the present invention could equally be applied to different media storage formats.

Figure 1:
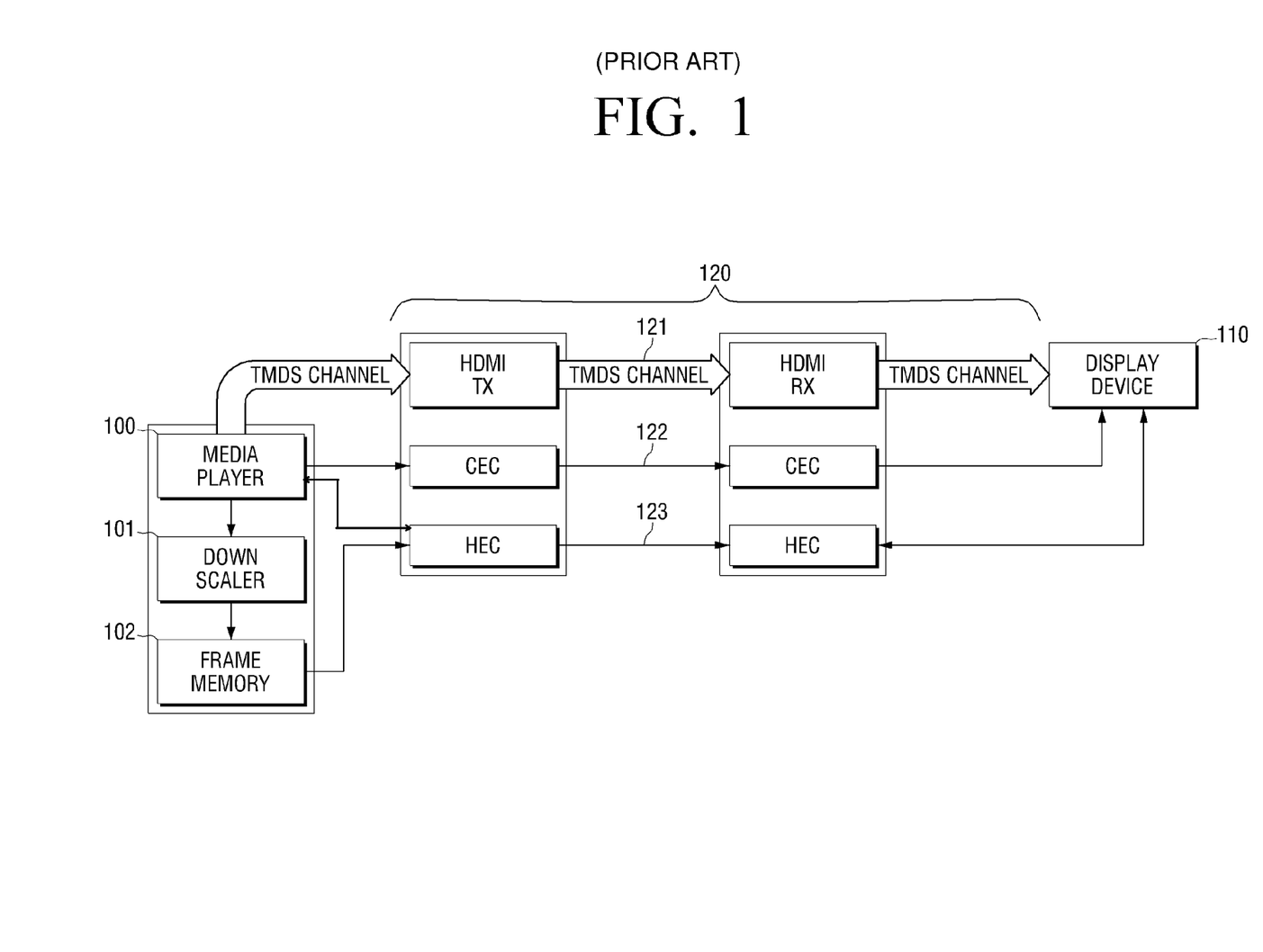
FIG. 1 illustrates an example of a media player and a display device according to an exemplary embodiment of the present invention.

A media playing apparatus and a video display apparatus according to an exemplary embodiment of the present invention are shown in FIG. 1. As shown in FIG. 1, an exemplary embodiment of the present invention includes a media player 100 connected to a display device 110 connected via a high definition multimedia interface (HDMI) 1.4 connection 120. As noted above, the HDMI 1.4 connection includes an HDMI Ethernet channel (HEC) 123. The HDMI connection 120 also includes TMDS channels 121 for normal transmission of high definition video and audio data, and a Consumer Electronics Control (CEC) channel 122.

According to an exemplary embodiment, a user may control the media player 100 to downscale the video signal output from the media player to reduce the resolution of the video signal, and thus reduce the amount of data needed to transmit to the display device 110 via the HDMI connection 120. Normally, a high definition video signal would be transmitted from the media player 100 to the display device 110 via the TMDS channels 121 of the HDMI 120. However, the user may not want to see the video signal output from the media player 100 in full high definition on the display device 110 at certain times.

For example, when a user inserts a medium such as a DVD or a BD into the media player 100, the media player 100 will presumably first execute a loading process to load the medium before playing the main video which the user may wish to see. During this time, a user may wish to utilize the display device 110 for other purposes, such as displaying a broadcast signal, or a video signal from some other source besides the media player 100.

Alternatively, the user may wish to switch from watching the video signal output from the media player 100 in a main window on the display device 110 to a sub-window on the display device 110. In such cases, the user may also wish to minimize the use of resources by the display device 110 by choosing not to show the video signal output from the media player 100 in high definition on the display device 110.

An exemplary embodiment of the present invention utilizes a downscaler 101 to downscale the high definition video signal output from the media player 100. The downscaled video signal is then buffered in a frame memory 102 for transmitting whole downscaled video frames to the display device 110. Since the video signal is downscaled, the HEC channel 123 of the HDMI connection 120 can be used to send the frames of the downscaled video signal to the display device 110. Consequently, the media player 100 could cease sending the high definition video signal to the display device 110 via the TMDS channels 121 of the HDMI connection 120.

By using the HEC channel to transmit a downscaled video signal from the media player 100 to the display device 110, the user might be able to preserve the resources of both the media player and the display device. For example, the display device might not have to expend as much processing power as it might to process a high definition video signal. Similarly, the media player might not have to process the video signal for transmission over the TMDS channels 121 of the HDMI connection 120. Further, since less signaling is required to communicate a single signal over the HEC channel 123 between the media player 100 and the display device 110, it may also be possible to conserve power since the multiple signals normally transmitted over the TMDS channels 121 are not required to transmit the downscaled video signal.

It should be noted that while the media player 100 of FIG. 1 includes the downscaler 101 and the frame memory 102, one of skill in the art would understand that these components could readily be installed in a separate apparatus.

Figure 2:
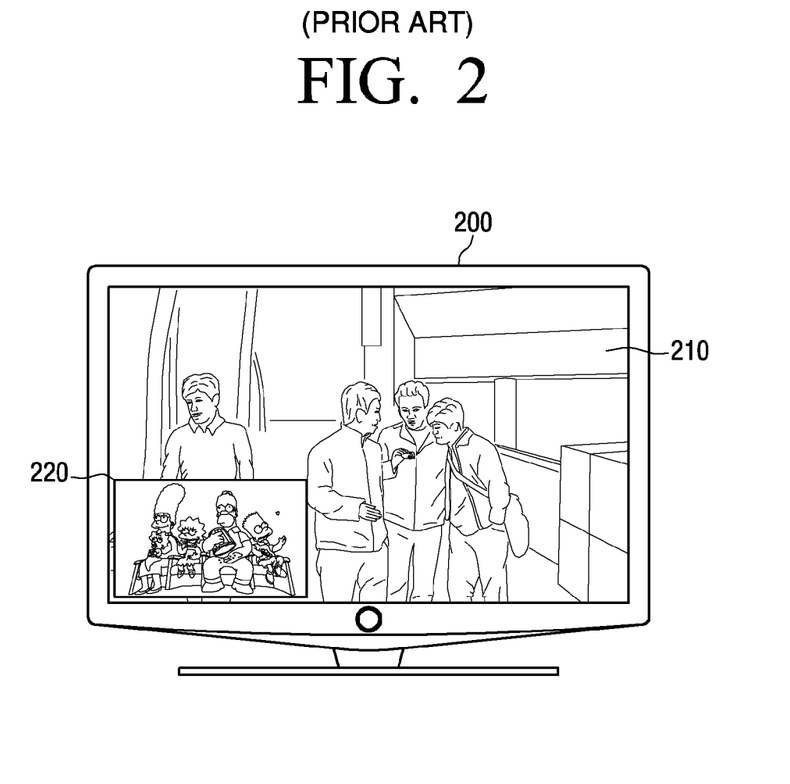
FIG. 2 illustrates an example of an operation according to an exemplary embodiment of the present invention.

FIG. 2 shows a display screen 200 of a display device having a main window 210 and a sub-window 220. A user could select the option to downscale the video signal output from the media player, and thereby display the video signal output from the media player in the sub-window 220. At the same time, the user may utilize the main window 210 of the display screen 200 to display a video signal from another source (not shown). The user might then be able to maximize the downscaled video signal sent from the media player so as to occupy the entire display screen 200, or exchange windows with the displayed video signal from another source, i.e., move the displayed video signal from the sub-window 220 to the main window 210, and vice versa. In either case, the media player could be commanded to stop downscaling the video signal output from the media player, and begin transmitting the high definition video signal across the TMDS channels of the HDMI connection.

As used herein, the phrase "main window" can include a window which is essentially a maximized window 210 such as shown in FIG. 2, or a window that is perhaps not maximized with respect to the display screen 200, but simply displaying a video signal in high definition (unlike the displaying of the downscaled video signal in the sub-window 220).

Further, while FIG. 2 simply shows one sub-window 220, the display device could easily display multiple sub-windows, for example from multiple input sources which output a downscaled video signal to the display device. Additionally, the display device itself may include a downscaler which could downscale alternative input signals for displaying multiple sub-windows simultaneously with the downscaled video signal output from the media player to the display device (i.e, and displayed in sub-window 220).

Figure 3:
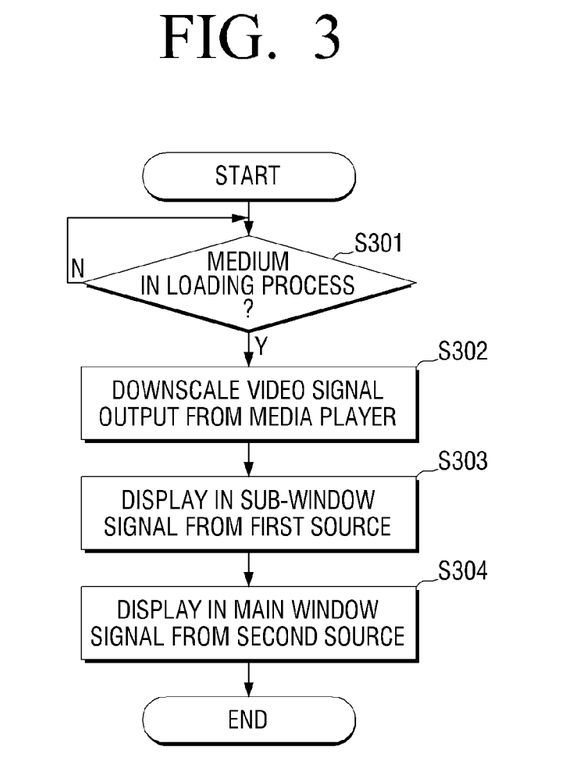
FIG. 3 illustrates an example of an operation according to an exemplary embodiment of the present invention.

FIG. 3 illustrates an operation according to an exemplary embodiment of the present invention. In operation S301, a determination is made whether the medium in the media player is in the loading process. If it is determined that the medium in the media player is in the loading process (S301-Y) the video signal output from the media player is downscaled in S302. Otherwise, the process can be made to begin again (S301-N). Once the video signal output from the media player is downscaled in S302, the downscaled video signal is transmitted to the display device and displayed in a sub-window (S303) on the display screen. Meanwhile, the display device can be made to display a video signal from another source (e.g., broadcast signal, an alternate HDMI source, etc.) in a main window on the display screen (S304).

Figure 4:
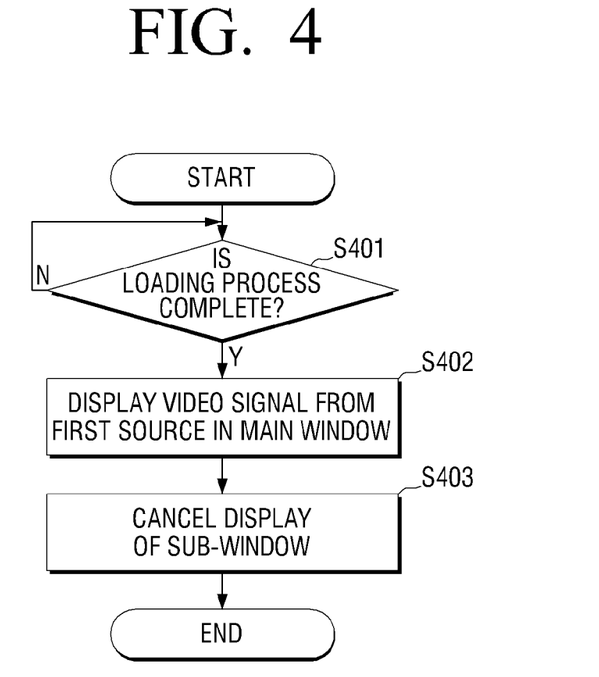
FIG. 4 illustrates an example of an operation according to an exemplary embodiment of the present invention.

FIG. 4 illustrates another operation according to an exemplary embodiment of the present invention. In operation S401, a determination is made whether the medium loading process is complete. For example, the BD or DVD may have completed its introductory segment, or FBI warning, etc. At this time, the user may decide to display the video signal output from the media player in the main window on the display screen. Thus, an additional operation might be included to determine whether the user has sent a control signal to display the video signal output from the media player in the main window on the display screen (not shown). If it is determined that the loading process is complete (S401-Y), the video signal output from the media player (i.e., "first source" in FIG. 4) is downscaled in S302. Otherwise, the process can be made to begin again (S401-N). In operation S402, the display screen begins displaying the video signal output from the media player in the main window on the display screen. Also, in operation S403 the displaying of the sub-window may be cancelled.

It should be noted that the canceling of the displaying of the sub-window can precede, coincide with, or follow the termination of the downscaling operation at the media player. Further, the displaying of the video signal from the media player in the main window in operation S402 would mean that the display screen would begin displaying the video signal from the media player in high definition, which would be transmitted from the media player to the display device via the TMDS channels of the HDMI connection.

Note that the displaying of the sub-window does not have to be cancelled. For example, the user may simply wish to switch the video signal being displayed in the sub-window with the video signal being displayed in the main window. In this case, the media player would simply begin transmitting the high definition video signal to the display device via the TMDS channels of the HDMI connection. The display device could then be operated to display something else in the sub-window, or possibly continue displaying a downscaled video signal from the media player simultaneously with the high definition video signal from the media player.

Figure 5:
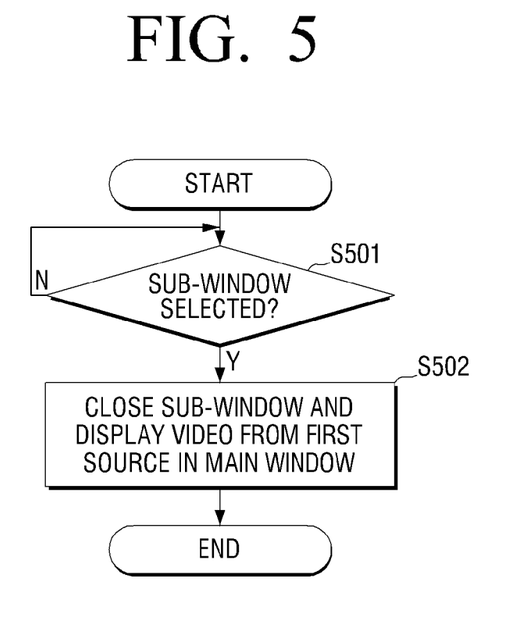
FIG. 5 illustrates an example of an operation according to exemplary embodiment of the present invention.

FIG. 5 illustrates another operation according to an exemplary embodiment of the present invention. In operation S501, a determination is made whether the sub-window is selected by a user. If the sub-window is selected by a user (S501-Y), the displaying of the sub-window can be canceled and the display screen can display the video from the media player in the main window (S502).

Again, the canceling of the displaying of the sub-window can precede, coincide with, or follow the termination of the downscaling operation at the media player. Further, the displaying of the video signal from the media player in the main window in operation S502 would mean that the display screen would begin displaying the video signal from the media player in high definition, which would be transmitted from the media player to the display device via the TMDS channels of the HDMI connection.

Figure 6:
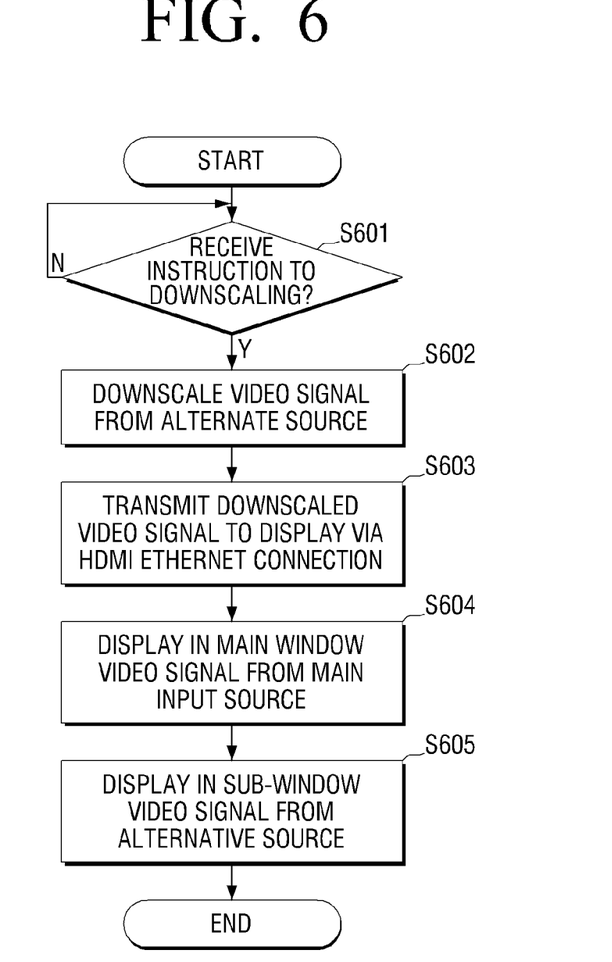
FIG. 6 illustrates an example of an operation according to exemplary embodiment of the present invention.

FIG. 6 illustrates another operation according to an exemplary embodiment of the present invention. In operation S601, a determination is made whether an instruction is received to begin downscaling the video signal from the media player. If the instruction is received to begin downscaling (S601-Y), the video from the media player (i.e., "alternate source") would be downscaled and transmitted to the display device via the Ethernet channel of the HDMI connection (S603). The display device can then display both a video signal from a main input source in a main window (S604) and the downscaled video signal received from the media player in a sub-window on the display screen (S605).

It should be noted that the while the phrases "first source," "alternate source" and "media player" have been used interchangeably herein, the present invention is not limited to any specific type of media player. Further, as noted above, while the exemplary embodiments described herein use an Ethernet channel of an HDMI 1.4 connection between the video signal source and the display device, the present invention is not limited to any particular communication standard for the connection between the video signal source and the display device. In general, the present invention simply utilizes a connection between a video signal source and a display device whereby a high definition video signal can be downscaled and transmitted over a lower-bandwidth type of communication channel (with respect to the normal communication channel(s) that may be required for transmitting a high definition signal).

Figure 7:
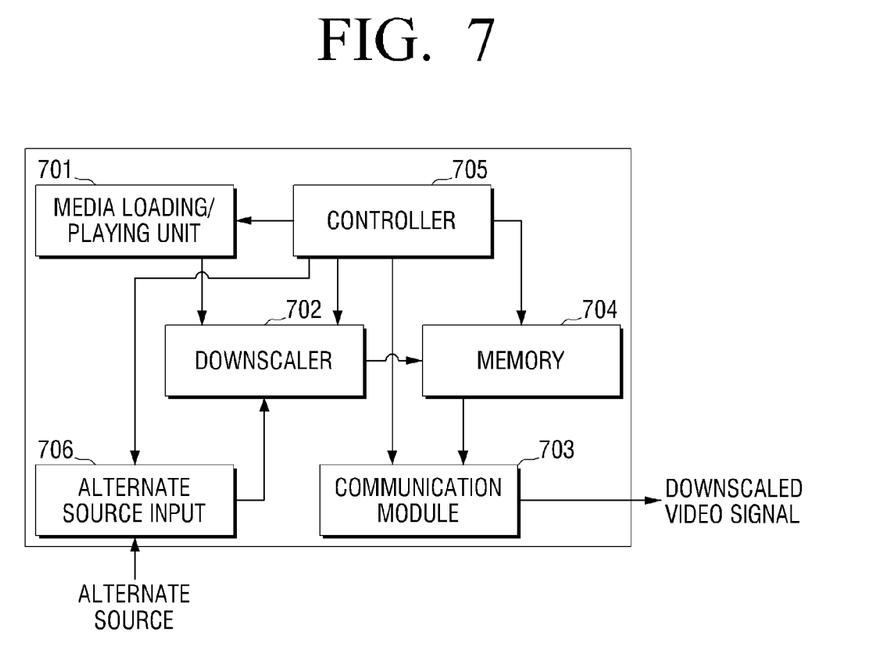
FIG. 7 illustrates an example of a media player according to an exemplary embodiment of the present invention.

FIG. 7 shows a media player 700 according to an exemplary embodiment of the present invention. The media player 700 includes a media loading/playing unit 701 in which a user may load a medium, and wherein a loading process may be initiated and wherefrom a playing process may occur. The media player 700 further includes a downscaler 702 which downscales the video signal from the media loading/playing unit 701. The downscaler 702 outputs the downscaled video signal to the memory 704, where the frames of the downscaled video signal may be buffered to facilitate transmission to the display device via the communication module 703. The controller 705 controls the interaction and flow of operations resulting in the output of the downscaled video signal.

Additionally, FIG. 7 includes an alternate source input module 706. This allows alternate input sources to transmit a video signal to the media player 700 (e.g., via an HDMI connection). The video signal from the alternate input source could be downscaled by the downscaler 702, buffered in the memory 704 and output to be transmitted to the display device via the communication module 703.

Figure 8:
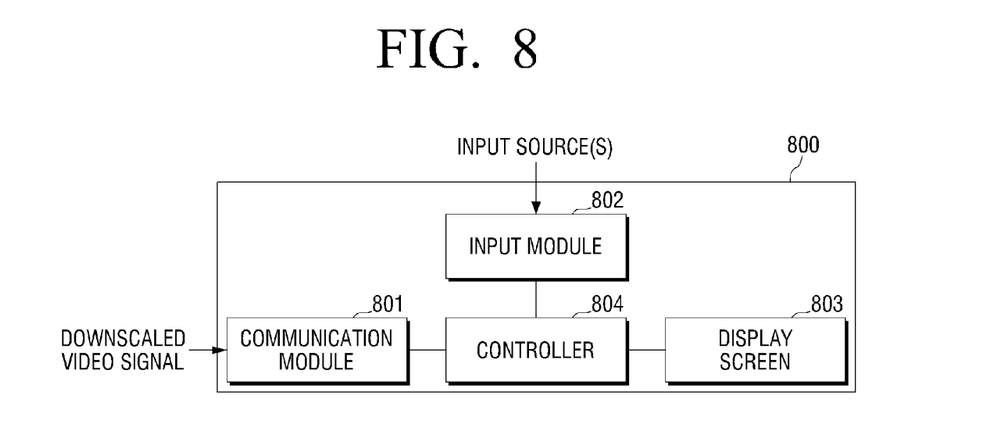
FIG. 8 illustrates an example of a display device according to an exemplary embodiment of the present invention.

FIG. 8 shows a display device 800 having an input module 802, which could accept video signals from a variety of input sources, a communication module It should be noted that FIGS. 7 and 8 are simplified so as to facilitate easier understanding. For example, while the connections in FIGS. 7 and 8 are shown as being in between the various components noted above, these depictions are merely utilized for convenience. One of skill in art would understand that it is entirely possible to channel internal signals through a controller, and/or via a master data bus, etc. Similarly, one of skill in the art would recognize that other components could easily be inserted into FIGS. 7 and/or 8 (e.g., video and audio processors, remote control communication modules, etc.); likewise components might also be combined (e.g., the communication module 801 and the input module 802 of FIG. 8). Again, the examples shown in all of the drawings are not meant to be limiting, but rather simply to aid understanding by providing a simplified view of the respective exemplary embodiments.

Additionally, it should be noted that in the exemplary embodiments described above, the user is described as having the option of selecting to downscale the video signal output from the media player for transmission to the display device. A user might make such a selection using a remote control, for example. However, the selection might also be made automatically.

For example, during the loading process, a determination could be made that the loading process is beginning, in process and/or complete. One of skill in the art would understand that such a determination can be made based on the analysis of the data on the medium itself. For example, a transitional point between video segments on the medium may be signified by the presence (or absence) of some unique data identifier. As noted above, the HDMI connection includes a CEC channel which can be used for sending/receiving control signals between connected devices. According to an exemplary embodiment of the present invention, the CEC channel could be used to send a signal from the media player to the display device signaling the outputting of the downscaled video signal to the display device. Likewise, the CEC channel could be used to send a signal from the display device to the media player signaling the command to begin downscaling (and outputting of the downscaled signal). A user could feasibly control either device so as to initiate the command to begin and/or end downscaling (and outputting and display of the downscaled signal by the media player and display device, respectively).

It should be noted that the HEC channel might also be used for control signaling between the media player and the display device. Both the HEC and the CEC channels are capable of bidirectional communications. Consequently, either channel might be utilized for communicating control signals between the media player and the display device. If the HEC channel is to be used for both control signaling and the transmission of the downscaled video signal, it may be necessary to multiplex the downscaled video signal with the control signals. One of skill in the art would understand that in such a case additional circuitry and/or programming might be required at either or both ends.

Alternatively, the entire control process could be automated at the media player and/or the display device. For example, the media player might be programmed (or commanded, e.g. by the user or the display device) so as to begin downscaling at some point in time after a medium is first loaded into the media player and for a predetermined duration while the loading process ensues. Likewise, the downscaling process could be programmed to cease after a predetermined duration. One of skill in the art would understand that these programming controls are possible at either or both ends. Of course such predetermined operating times could be adjustable by a user according to her personal preference.

Additionally, according to an exemplary embodiment of the present invention, the HDMI connection may include a Display Data Channel (DDC) Channel, Extended display identification data (EDID), Enhanced Display Data Channel (E-DDC) and/or Infoframe information. Some HDMI Infoframe protocols can transfer to a display apparatus (e.g., a television (TV)). For example, Auxiliary Video Information (AVI) Infoframe and Vendor Specific Infoframe. That is, with the use of some Inforframe protocols, information may be transferred from media player to display apparatus. In this case it is possible to use Inforframe information as a channel for control information related the video content on the medium. Further, the EDID data structure may include information specific to the particular display apparatus, which can permit the display apparatus to describe its specific capabilities to the media player.

Figure 9A:
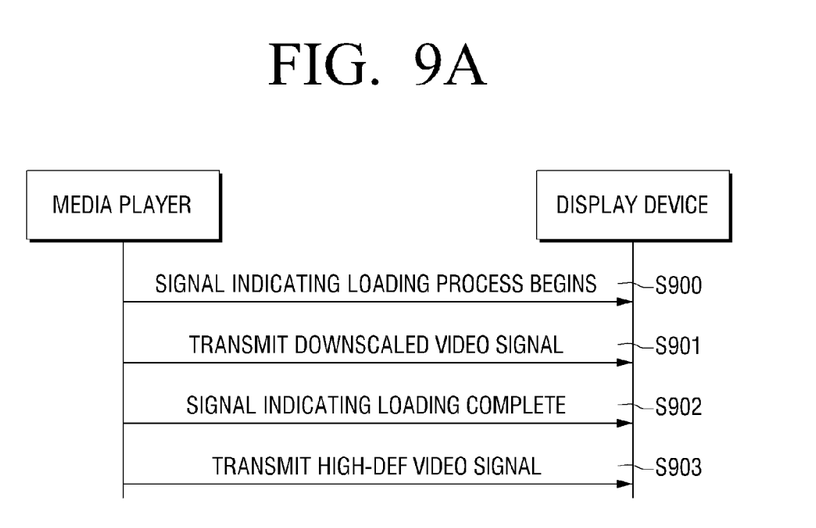
FIG. 9A illustrates an example of a signaling diagram according to exemplary embodiment of the present invention.

FIG. 9A illustrates signaling diagram according to an exemplary embodiment of the present invention. In operation S900, the media player sends a signal to the display device indicating the beginning of the loading process. Next, in operation S901, the media player can then transmit the downscaled video signal to the display device. Once the loading of the medium is complete, the media player can transmit a signal indicating that the loading is complete to the display device (S902). After that, the media player can transmit the high definition video signal to the display device (S903).

Figure 9B:
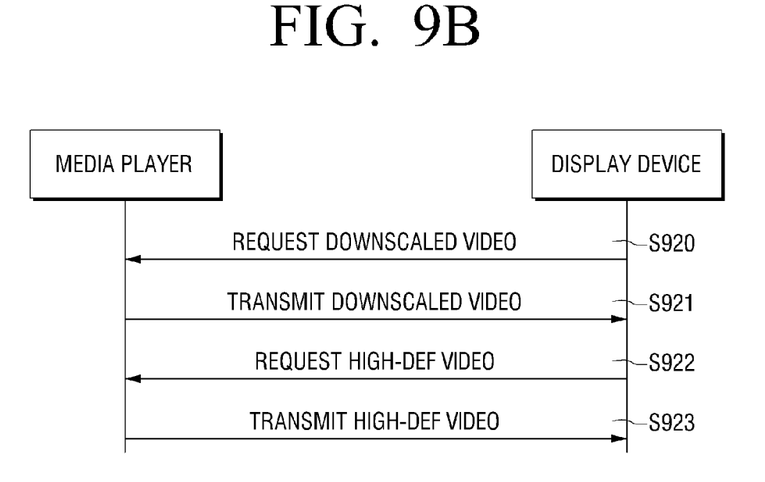
FIG. 9B illustrates another example of a signaling diagram according to exemplary embodiment of the present invention.

It should be noted that additional steps are possible in the above process. FIG. 9B shows some examples of these additional possibilities. In operation S920, the display device sends a signal to the media player requesting the transmission of the downscaled video signal. In response, in operation S921 the media player transmits the downscaled video signal to the display device. Likewise, the display device can also send a request signal to the media player requesting the transmission of the high definition video signal (S922), upon which the media player can begin transmission of the high definition video signal to the display device (S923). One of skill in the art would understand that such control signaling can be easily incorporated into the simplified signaling diagram shown in FIG. 9A.

Additionally, in some cases some signals may not be necessary. For example, the signal indicating the completion of the loading (S902 in FIG. 9A) may not be necessary in the event the system is designed to respond to the requesting by the display device of the transmission of the high definition video signal from the media player (S922 in FIG. 9B). Furthermore, as noted above, a user may utilize a remote control (or via a control panel) to command the media player and/or the display device. Thus, a user may simply issue a command to the media player/display device to begin/end transmitting/receiving the downscaled/high definition video signal(s).

The foregoing exemplary embodiments are merely exemplary and should not be construed as limiting the present invention. The present teaching can be readily applied to other types of methods and apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for displaying video signals on a display screen of a display apparatus, wherein the video signals are received by the display apparatus from a plurality of input sources, the method comprising:
    displaying in a sub-window on the display screen a video signal output from a first input source of the display apparatus;
    displaying in a main window on the display screen a video signal output from a second input source of the display apparatus;
    determining whether an additional signal is received from the first input source; and
    displaying a video signal input from the first input signal source of the display apparatus entirely on the display screen based on the received additional signal,
    wherein the first input source of the display apparatus is an external video playing device which plays a media storage medium,
    wherein the additional signal is data generated by the external video playing device to indicate that a process for playing a main video of the media storage medium by the external video playing device is completed.

2. The method of claim 1, further comprising:
    determining whether the loading process of the media storage medium input from the first input source is complete; and
    if the loading process of the media storage medium input from the first input source is complete, displaying in the main window the video signal of the media storage medium output from the first input source of the display apparatus.

3. The method of claim 2, further comprising:
if the loading process of the media storage medium input from the first input source is complete, canceling the displaying of the sub-window on the display screen.

4. The method of claim 1, further comprising:
determining whether a user selects the sub-widow displayed on the display screen; and
if the user selects the sub-window displayed on the display screen, closing the sub-window, and displaying the video signal output from the first input source in the main window on the display screen.

5. The method of claim 1, wherein the determining of whether the media storage medium input from the first input source of the display apparatus is in the loading process includes monitoring a High-Definition Multimedia Interface (HDMI) connection between the first input source and the display apparatus.

6. The method of claim 1, wherein the displaying in the sub-window on the display screen includes downscaling the video signal of the media storage medium output from the first input source.

7. The method of claim 6, further comprising:
buffering the downscaled video signal,
wherein the displaying in the sub-window on the display screen includes transmitting the buffered video signal to the display apparatus and displaying the buffered video signal received by the display apparatus in the sub-window on the display screen.

8. The method of claim 7, wherein the transmitting of the buffered video signal to the display apparatus includes transmitting the buffered video signal to the display apparatus over a High-Definition Multimedia Interface (HDMI) connection.

9. The method of claim 8, wherein the HDMI connection includes an Ethernet channel.

10. The method of claim 6, the method further comprising:
displaying at least one other sub-window on the display screen,
wherein each of the at least one other sub-windows displays a video signal output from one of the second input source and another source,
wherein the video signal output from the one of the second input source and the other source is downscaled.

11. The method of claim 1, wherein the first input source is one of a Blu-ray Disc (BD) player and a Digital Versatile Disc (DVD) player.

12. A method for displaying a video signal on a display screen of a display apparatus, wherein the display apparatus is connected with an alternate input source via a High-Definition Multimedia Interface (HDMI) connection, wherein the HDMI connection includes an Ethernet channel, the method comprising:
downscaling a video signal of a media storage medium from the alternate input source;
transmitting the downscaled video signal to the display apparatus via the Ethernet channel of the HDMI connection;
displaying in a main window on the display screen a video signal output from a main input source of the display apparatus;
displaying in a sub-window on the display screen the downscaled video signal received from the alternate input source;
determining whether an additional signal is received from the alternate input source; and
displaying the video signal input from the alternate input signal source of the display apparatus entirely on the display screen based on the received additional signal,
wherein the first input source of the display apparatus is an external video playing device which plays the media storage medium,
wherein the additional signal is data generated by the external video playing device to indicate that a process for playing a main video of the media storage medium by the external video playing device is completed.

13. A media playing apparatus for transmitting a downscaled video signal from an input source to a display apparatus during a loading process of a media storage medium, the media playing apparatus comprising:
a media playing unit which is operable to receive the media storage medium, perform the loading process of the media storage medium and output a video signal corresponding to the playing of the media storage medium;
a downscaler which is operable to downscale the video signal of the media storage medium output from the media player and to output a downscaled video signal;
a memory which is operable to buffer the downscaled video signal received from the downscaler;
a communication module which is operable to transmit the buffered video signal from the memory to the display apparatus; and
a controller to determine whether the media playing unit is performing the loading process of the media storage medium, if the media playing unit is performing the loading process of the media storage medium, the controller controls the downscaler to downscale the video signal output from the media playing unit and to output the downscaled video signal, controls the memory to buffer the downscaled video signal received from the downscaler and controls the communication module to transmit the buffered video signal from the memory to the display apparatus, and if the media playing unit completes a process for playing a main video of the media storage medium, the controller generates an additional signal and controls the communication module to transmit the additional signal and a main video signal to the display apparatus,
wherein the additional signal is data to indicate that the process for playing the main video of the media storage medium by the medial playing unit is completed.

14. The media playing apparatus of claim 13, wherein the controller further determines whether the loading process of the media storage medium is complete, and if the loading process of the media storage medium is complete, the controller controls the communication module to stop transmitting the buffered video signal from the memory to the display apparatus.

15. The media playing apparatus of claim 13, wherein the controller determines whether the media playing unit is performing the loading process of the media storage medium by monitoring a High-Definition Multimedia Interface (HDMI) connection between the media playing apparatus and the display apparatus.

16. The media playing apparatus of claim 13, wherein the transmitting of the buffered video signal to the display apparatus includes transmitting the buffered video signal to the display apparatus over a High-Definition Multimedia Interface (HDMI) connection.

17. The media playing apparatus of claim 16, wherein the HDMI connection includes an Ethernet channel.

18. The media playing apparatus of claim 13, wherein the first input source is one of a Blu-ray Disc (BD) player and a Digital Versatile Disc (DVD) player.

19. A video display apparatus which communicates with a first input source via a High-Definition Multimedia Interface (HDMI) connection, wherein the HDMI connection includes an Ethernet channel, the video display apparatus comprising:
- a display screen;
- a communication module which is operable to receive a video signal of a media storage medium from the first input source via the Ethernet channel of the HDMI connection;
- an input module which is operable to receive an input video signal from a second input source; and
- a controller to control the display screen to display the video signal in a sub-window on the display screen, to control the display screen to display the input video signal received from the second input source in a main window on the display screen, to determine whether an additional signal is received from the first input source, and to control the display screen to display the video signal input from the first input source entirely on the display screen based on the received additional signal,
- wherein the first input source of the display apparatus is an external video playing device which plays the media storage medium,
- wherein the additional signal is data generated by the external video playing device to indicate that a process for playing a main video of the media storage medium by the external video playing device is completed.

20. The video display apparatus according to claim 19, wherein:
- the controller further determines whether a first control signal is received from the first input source via the HDMI connection; and
- the first control signal indicates the process for playing the main video of the media storage medium is not completed.

21. The video display apparatus according to claim 20, wherein:
- if the controller determines the control signal is received from the first input source via the HDMI connection, the controller sends a second control signal to the first input source via the HDMI connection, and
- the second control signal controls the first input source to transmit the video signal from the first input source to the video display apparatus via the Ethernet channel of the HDMI connection.

* * * * *